United States Patent [19]
Shirahama et al.

[11] Patent Number: 5,909,258
[45] Date of Patent: Jun. 1, 1999

[54] CATHODE RAY TUBE DISPLAY AND TELEVISION SET HAVING THE SAME

[75] Inventors: Akira Shirahama, Kanagawa; Takahiko Tamura; Jun Ueshima, both of Tokyo, all of Japan

[73] Assignee: Sony Corporation, Tokyo, Japan

[21] Appl. No.: 08/654,206

[22] Filed: May 28, 1996

[30] Foreign Application Priority Data

May 31, 1995 [JP] Japan ................................. 7-155634

[51] Int. Cl.⁶ .............................. H01V 29/98; H04N 5/46
[52] U.S. Cl. .................... 348/806; 348/807; 348/537; 348/448; 348/776; 315/370
[58] Field of Search .................................. 348/522, 523, 348/529, 530, 531, 540, 546, 547, 548, 443, 445, 805, 806, 807, 745, 746, 747, 537, 776, 448; 315/370, 399, 368.18

[56] References Cited

U.S. PATENT DOCUMENTS

| | | | |
|---|---|---|---|
| 5,345,280 | 9/1994 | Kimura et al. ........................... | 348/745 |
| 5,461,431 | 10/1995 | Takebuchi et al. ..................... | 348/806 |
| 5,506,481 | 4/1996 | Wada et al. ............................. | 348/806 |
| 5,519,447 | 5/1996 | Shima et al. ............................ | 348/556 |
| 5,523,789 | 6/1996 | Oguchi et al. .......................... | 348/448 |
| 5,699,123 | 12/1997 | Ebihara et al. ......................... | 348/445 |
| 5,712,532 | 1/1998 | Ogino et al. ............................ | 348/537 |

*Primary Examiner*—Tommy P. Chin
*Assistant Examiner*—Anand Rao
*Attorney, Agent, or Firm*—Frommer Lawrence & Haug, LLP; William S. Frommer; Dennis M. Smid

[57] ABSTRACT

In a CRT display and a television set having the same, horizontal/vertical synchronizing signals are separated from a video synchronizing signal in a synchronizing separation circuit, and position information S of a vertical frame is generated on the basis of the horizontal/vertical synchronizing signals in a count-down processor and then converted to corrected vertical frame information W in a function circuit to output a vertical deflection waveform signal and a horizontal deflection correcting waveform signal. Further, the corrected vertical frame information W is compared with predetermined voltages in comparators to detect an effective frame range in the vertical direction.

12 Claims, 10 Drawing Sheets

FIG. 1A

NORMAL MODE

FIG. 1B

ZOOM MODE

FIG. 1C

WIDE MODE

FIG. 11(a) V. SYNC

FIG. 11(b) OUTPUT OF CUT DOWN PROCESSOR

FIG. 11(c) OUTPUT OF FUNCTION CIRCUIT

FIG. 11(d) OUTPUT OF COMPARATOR 7

FIG. 11(e) OUTPUT OF COMPARATOR 8

FIG. 11(f) RETRACE PULSE

FIG. 11(g) TIMING PULSE

FIG. 12

CATHODE RAY TUBE DISPLAY AND TELEVISION SET HAVING THE SAME

BACKGROUND OF THE INVENTION

The present invention relates to a cathode ray tube display mounted in a television set or the like, and a television set having the same, and more particularly to a cathode ray tube display having a screen aspect ratio of 16:9 and a television set having the same.

Cathode ray tube (hereinafter referred to as "CRT (Cathode Ray Tube)") displays used in television sets or the like have been recently designed in a wide size, and this wide-size design has promoted the spread of CRT displays having screens whose aspect ratio is 16:9 (hereinafter referred to as "16:9 CRT displays (or screens)") together with conventional CRT displays having screens whose aspect ratio is 4:3 (hereinafter referred to as "4:3 CRT displays (or screens)").

A television set having a CRT display of aspect ratio 16:9 as described above (hereinafter referred to as "wide television") is designed so that in several kinds of picture (display) mode users can watch pictures which comprise frames of an aspect ratio 4:3 of the conventional NTSC system (hereinafter referred to as "4:3 pictures").

Figure 1A:
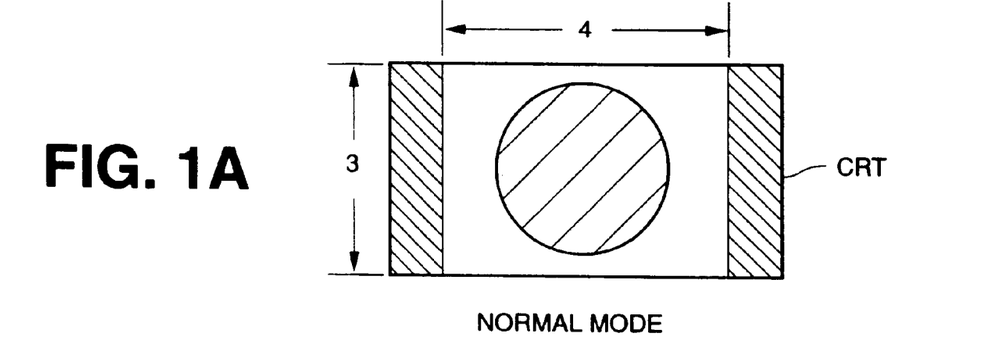
FIGS. 1A to 1C are diagrams showing display frames in respective modes of a wide television.
Figure 1B:
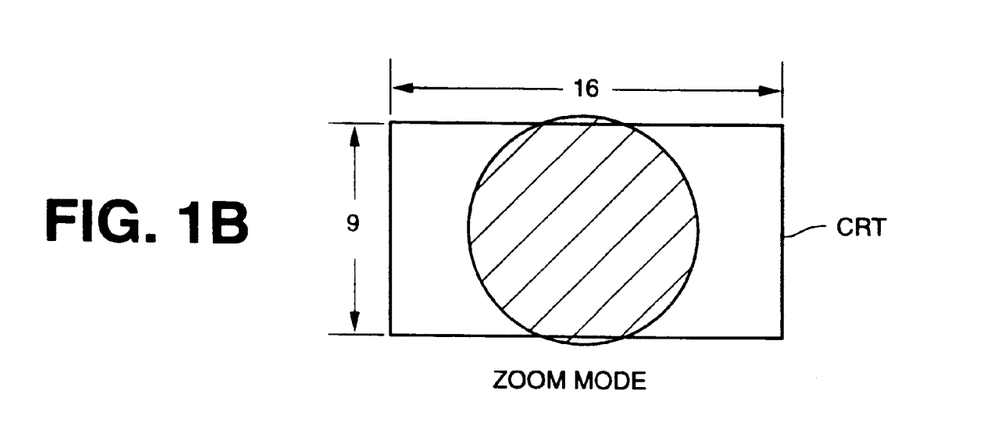
Figure 1C:
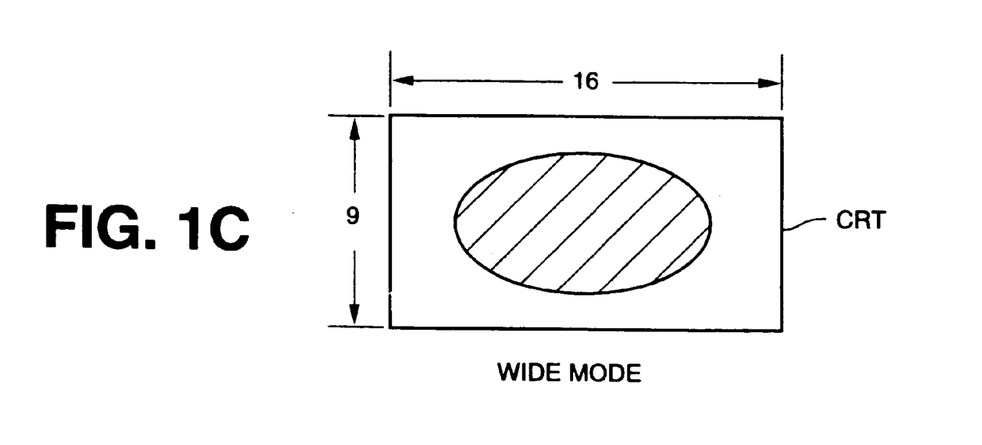

These picture modes include a normal mode in which a 4:3 picture is directly reproduced on a 16:9 screen (a screen having an aspect ratio of 16:9) as shown in FIG. 1A, a zoom mode in which a 4:3 picture is displayed on the 16:9 screen so that the lateral frame length of the 16:9 screen is made the same as the lateral length of the 4:3 picture and upper and lower portions of the 4:3 picture which protrude from the 16:9 screen in a vertical direction are trimmed as shown in FIG. 1B, a wide mode in which the 4:3 picture is enlarged on the 16:9 screen and the protruding upper and lower portions of the picture are compressed in the vertical direction of the screen as shown in FIG. 1C.

There is also known a television having a scroll mode in which a user can freely scroll the picture to watch upper or lower portions protruding from the 16:9 screen in the vertical direction when the zoom mode as described above is set.

In general, time information or the like which is displayed at the top of the screen, for example, in a morning or evening time range, is trimmed when the zoom mode is set, and it obstructs information supply to a user. The scroll mode as described above enables the scrolling of pictures in the vertical direction, so that a trimmed picture portion can be also displayed on the screen.

Accordingly, at the present time when pictures are displayed on a screen while enlarged (reduced), trimmed or the like, when an user watches on a wide television having a 16:9 screen video software of 4:3 aspect ratio which are respectively formed in the screen (display) modes as described above, it is necessary to optimally adjust both the frame size in the vertical direction and the picture position in the vertical direction for each of the respective software every time. In such a wide televisions, the adjustment of the frame size in the vertical direction has been hitherto performed by adjusting the amplitude of a vertical deflection (scan) waveform signal (VSAW), and also the adjustment of the vertical picture position has been performed by adjusting the DC component of the vertical deflection waveform signal (VSAW) or making the vertical linearity non-linear.

Figure 2:
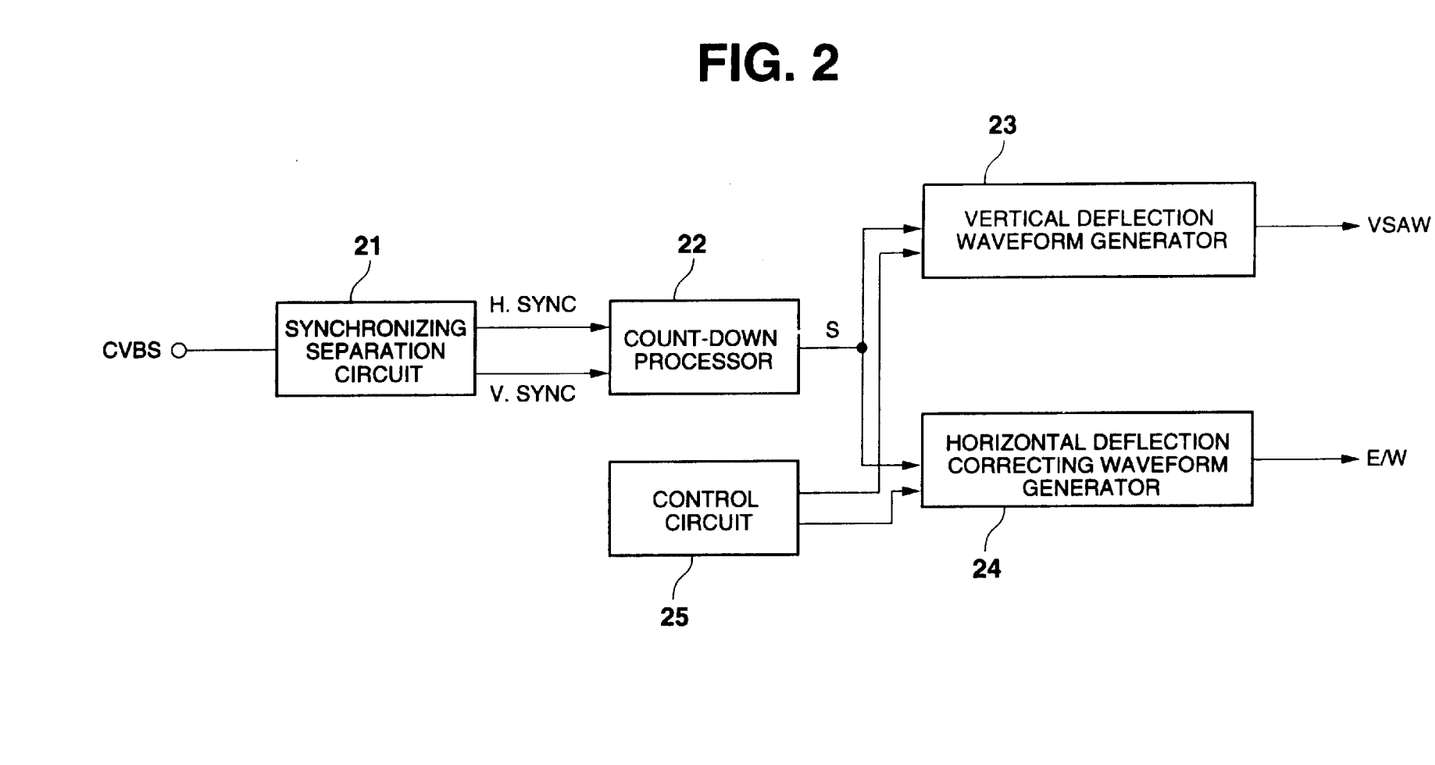
FIG. 2 is a block diagram of a deflection system of a conventional CRT display.

FIG. 2 is a circuit diagram showing a deflection system of the CRT display mounted in a wide television, for example.

In FIG. 2, reference numeral 21 represents a synchronizing separation circuit, and it serves to separate a vertical synchronizing signal (V.SYNC) and a horizontal synchronizing signal (H.SYNC) from a video signal (CVBS) which is supplied from a pre-stage circuit of a television set (not shown), and then output the separated vertical and horizontal synchronizing signals. Reference numeral 22 represents a count-down processor which comprises a counter or the like. The count-down processor 22 is normally reset by the vertical synchronizing signal, and it counts the horizontal synchronizing signal. For example, even when the vertical synchronizing signal (V.SYNC) output from the synchronizing separation circuit 21 is missing, the count-down processor 22 is reset with the same period as the vertical synchronizing signal to generate position information S of the vertical frame.

Reference numeral 23 represents a vertical deflection waveform generator which outputs a vertical deflection waveform signal (VSAW) which has been adjusted on the basis of the position information S of the vertical frame supplied from the count-down processor 22. Reference numeral 24 represents a horizontal deflection correcting waveform generator which outputs a horizontal deflection correcting waveform signal (E/w) to adjust the horizontal deflection waveform signal on the basis of the position information S of the vertical frame supplied from the count-down processor 22.

Reference numeral 25 represents a control circuit comprising a microcomputer or the like, and it outputs a control signal to control respective parameters of the vertical deflection waveform generator 23 and the horizontal deflection correcting waveform generator 24 as described below.

Figure 3:
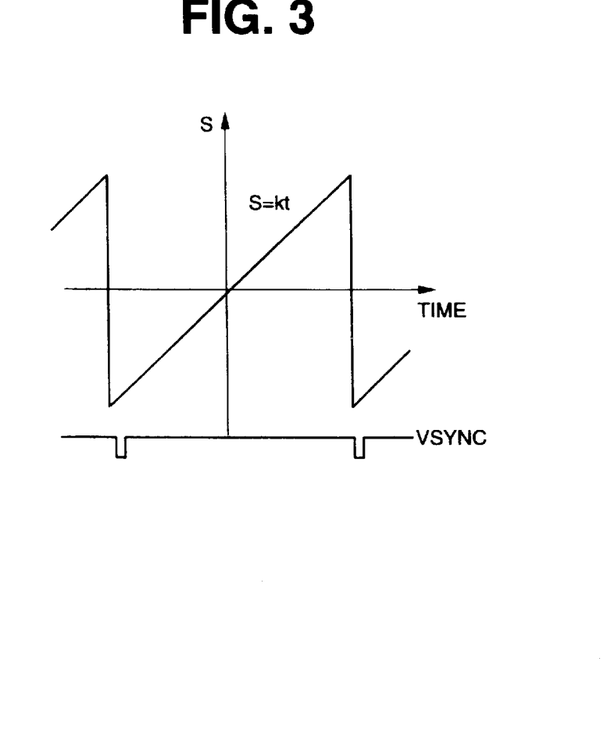
FIG. 3 is a diagram showing position information S of a vertical frame which is output from a count-down processor of the conventional CRT display.

The operation of the CRT display shown in FIG. 2 will be described with reference to the output waveform of each part shown in FIGS. 3, 4A and 4B.

The synchronizing separation circuit 21 separates a vertical synchronizing signal (V.SYNC) and a horizontal synchronizing signal (H.SYNC) from a video signal (CVBS) which is supplied from an earlier stage circuit (not shown), for example, and supplies these signals to the count-down processor 22. The count-down processor 22 generates and outputs the position information S of the vertical frame in conformity with the period of the vertical synchronizing signal (V.SYNC) shown in FIG. 3 on the basis of the vertical synchronizing signal (V.SYNC) and the horizontal synchronizing signal (H.SYNC). Further, the position information S of the vertical frame can be represented by s=Kt at each period of the vertical synchronizing signal (V.SYNC) where s represents an instantaneous value for representing a frame position with a time (K represents a coefficient, t represents time).

The position information S of the vertical frame is supplied to the vertical deflection waveform generator 23 and the horizontal deflection correcting waveform generator 24. For the instantaneous value s of the vertical frame position information S, the vertical deflection waveform generator 23 outputs the vertical deflection waveform signal (VSAW) adjusted according to the following function equation (1):

$$VSAW: v(s) = B(Cs^3 + Ds^2 + s) + A \qquad (1)$$

where A: parameter to adjust vertical frame position
B: parameter to adjust vertical frame size
C, D: parameters to adjust vertical linearity That is, if the value of each parameter is set to satisfy C=D=0 and B=1, the vertical deflection waveform signal becomes v(s)=s+A, and thus the frame is vertically scrolled in conformity with the value of the parameter "A". Further, the zoom mode display can be performed on the basis of the value of the parameter "B", and the linearity of the display frame can be corrected by the parameters "C", "D" and "B".

Figure 4A:
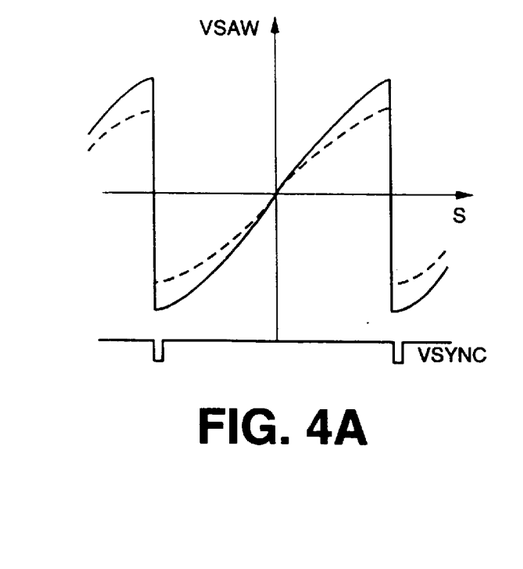
FIGS. 4A and 4B are diagrams showing vertical deflection waveform signals in a zoom mode and a scroll mode of the conventional CRT display.

On the other hand, the horizontal deflection correcting waveform signal (E/W) which is calculated by a function equation (2) shown below for the instantaneous value s of the position information S of the vertical frame (a signal to correct the horizontal deflection waveform signal) is output from the horizontal deflection correcting waveform generator 24 to form a horizontal deflection waveform signal whose linearity has been corrected with the above signal.

$$E/W: u(s)=F(Gs^4+s^2+Hs)+E \qquad (2)$$

where E: parameter to adjust horizontal frame size
F: parameter to correct horizontal pin distortion
G: parameter to correct horizontal corner pin distortion
H: parameter to correct horizontal trapezoidal distortion Here, it will be assumed that in the normal mode in which pictures of aspect ratio 4:3 are directly reproduced on a CRT display of a wide television having a screen aspect ratio of 16:9, a control signal with which the values of the respective adjustment parameters "A" to "D" of the function equation (1) are set to "$A_1$", "$B_1$", "$C_1$" and "$D_1$" is output from the control circuit 25 and the vertical deflection waveform signal (VSAW) with which an image having no distortion on the screen as shown by a chain line in FIG. 4A can be obtained is output from the vertical deflection waveform generator 23.

For example, when pictures are required to be enlarged in the zoom mode, the value "$B_1$" of the parameter B for adjusting the vertical frame size in the function equation (1) above is set to "$B_2$" on the basis of the control signal from the control circuit 25, and the amplitude of the vertical deflection waveform signal (VSAW) is varied as indicated by a solid line in FIG. 4A, whereby the vertical frame size is adjusted.

Figure 4B:
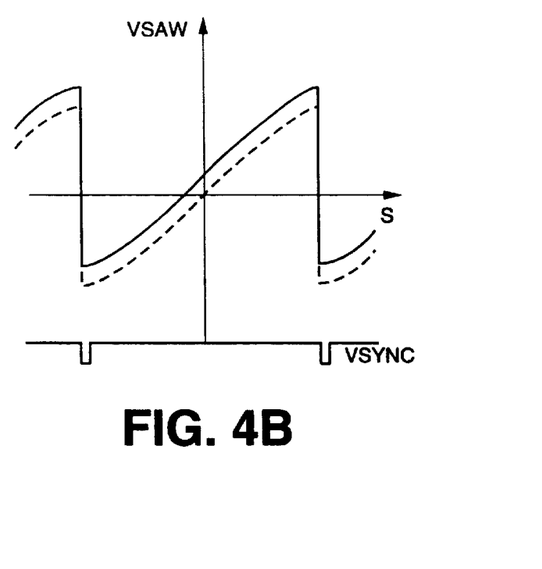

Further, when the pictures are scrolled in the vertical direction in the scroll mode, the value "$A_1$" of the parameter A for adjusting the picture position of the vertical frame in the function (1) is set to "$A_2$" on the basis of the control signal from the control circuit 25, and the vertical deflection waveform signal (VSAW) indicated by a chain line of FIG. 4B is shifted, for example, in the upward direction as indicated by a solid line in FIG. 4B, whereby the picture position of the vertical frame is adjusted.

Accordingly, by inputting the vertical deflection waveform signal (VSAW) and the horizontal deflection correcting waveform signal (E/W) to an output drive circuit in a later stage (not shown), horizontal and vertical deflection currents providing frames whose linearity and picture position on the screen are corrected can be generated and a picture whose linearity has been corrected has been finally displayed.

Figure 5A:
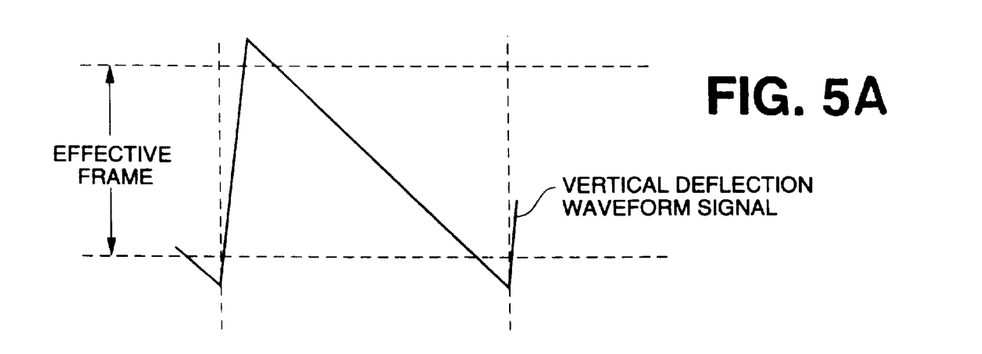
FIG. 5 shows time charts showing the waveform of a vertical deflection waveform signal in each screen modes wherein the upper part (a) of FIG. 5 shows the waveform in a normal mode, the middle part (b) of FIG. 5 shows the waveform in a zoom mode, and the lower part (c) of FIG. 5 shows the waveform in a wide mode.
Figure 5B:
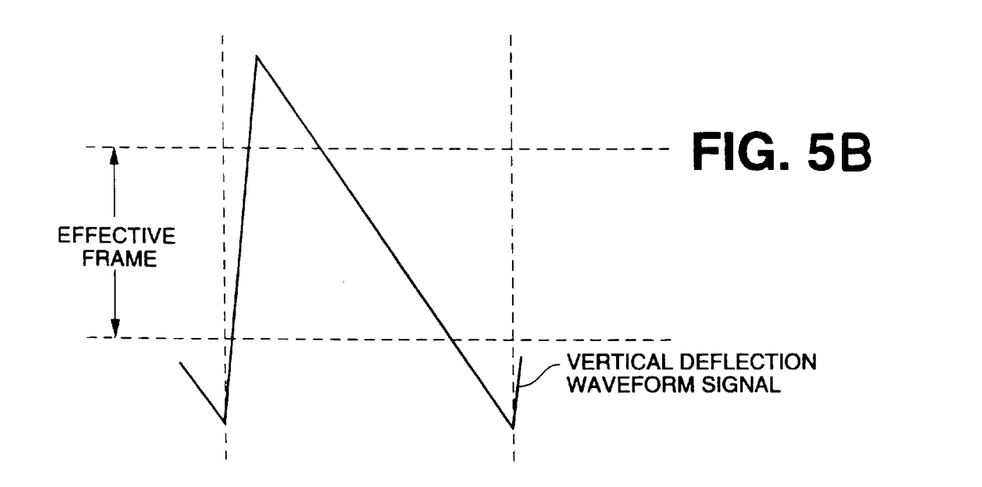
Figure 5C:
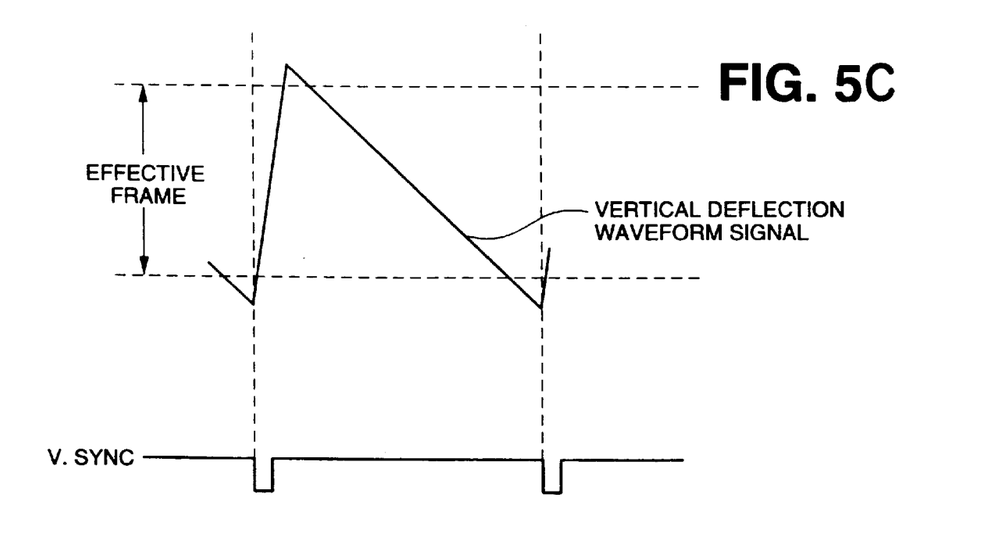

The vertical deflection current which is output in each screen mode of the wide television described above is set to one of the waveform current signals shown in parts (a) to (c) of FIG. 5. The upper part (a) of FIG. 5 shows the waveform of the vertical deflection current in the normal mode, the middle part (b) of FIG. 5 shows the waveform of the vertical deflection current in the zoom mode, and the lower part (c) of FIG. 5 shows the waveform of the vertical deflection current in the wide mode. Each vertical deflection current waveform in FIG. 5 is assumed to be linear to make understanding easy.

As is apparent from FIG. 5, the waveform of the deflection current in the zoom mode shown in (b) of FIG. 5 is increased by about 25% as compared with the waveforms of the vertical deflection current in both the normal mode and the wide mode because the amplitude of the vertical deflection waveform signal (VSAW) in the zoom mode is increased by about 25% as compared with the other screen modes.

However, paying attention to any one point in the vertical direction within the effective frame of the wide television as shown in FIG. 5, a one-to-one (1:1) corresponding relationship exists between any point and the vertical deflection current irrespective of the screen mode. Therefore, when the start point of the trace of the vertical deflection current is considered to be a start time, the time until the vertical deflection current reaches a specific value differs depending on the screen mode, and therefore the time period from the start time until a scan position reaches any one point on the screen differs in accordance with the screen mode.

A large number of wide televisions and other types of television which can display various parameters of currently-used functions (brightness, tone, etc.) on the screen have been recently put on the market. In order to display the parameters of the respective functions, a microcomputer built in a wide television monitors the current status of the screen mode and calculates a time period from the start time until the scan position reaches any one point on the frame to output a timing pulse together with the parameter information, whereby the parameters are displayed in the same positions on the screen.

As described above, the adjustment of the vertical frame size and the adjustment of the picture position of the vertical frame are performed by controlling the parameters "B" and "A" of the function equation (1) of the vertical deflection waveform generator 13, however, this adjustment work causes some distortion in the linearity of the vertical deflection waveform signal (VSAW) with respect to the vertical position of the frame and the horizontal pin cushion of the horizontal deflection correcting waveform signal (E/W).

Therefore, the values of all the parameters "A" to "H" of the function equation (1) for adjusting the vertical deflection waveform signal (VSAW) and the function equation (2) for correcting the horizontal deflection correcting waveform signal (E/W) for adjusting the horizontal deflection waveform must be adjusted again to correct the distortion of the vertical linearity and the horizontal pin cushion every time the adjustment of the vertical frame size and the position adjustment of the vertical frame are carried out.

In a CRT display of a wide television or the like in which the time period from the start time of the vertical synchronizing signal until the display time of the frame differs in accordance with the screen mode, when the frame is scrolled with the scroll mode to vary the picture position in the vertical direction under the zoom mode, a time period until the scan position arrives at any point in the vertical direction cannot be covered by merely setting some wait times, and each of the wait times must be calculated on the basis of the data of the screen mode. Therefore, a large load has hitherto been imposed on the software of the microcomputer.

In order to solve the above problem, there has also been proposed such a countermeasure that the horizontal synchronizing signals are digitally counted with the period of the vertical synchronizing signals and the calculation of the wait time which has been performed according to the software of the microcomputer is performed by using a deflection system circuit. However, from the viewpoint of the precision of an interface, the counting frequency must be set to several times as high as the horizontal synchronizing signal, and thus the cost rises.

Further, a deflection yoke in the vertical direction must be driven beyond the effective frame in the zoom mode, and thus reflection of electron beams may occur. Therefore, it is necessary that blanking is applied to video signals to avoid the reflection of the electron beams, and some restriction has had to be imposed on the output of the vertical drive circuit to avoid an undesired load from being imposed on the deflection yoke driving circuit. However, since the necessary video blanking time varies in accordance with the screen mode as described above, the setting of the video blanking is very troublesome In the case of limitation of the deflection current, if a limiter is merely provided in the vertical drive circuit, the output of the vertical drive circuit itself would fluctuate due to the adjustment as a result of dispersion of the CRT or the deflection yoke driving circuit, and consequently it has not been possible to obtain a sufficient effect.

SUMMARY OF THE INVENTION

The present invention has been achieved to solve these problems, and an object of the present invention is to provide a cathode ray tube display with which it is possible to prevent horizontal direction pin cushion distortion and easily ascertain the vertical direction picture position.

To achieve this object and other objects, the invention provides a cathode ray tube display which comprises synchronization separating means for separating horizontal/vertical synchronizing signals from video signals, waveform generating means for counting the horizontal/vertical synchronizing signals obtained by the synchronization separating means and outputting vertical frame position information S corresponding to the period of the vertical synchronizing signals, control means for outputting a predetermined control signal, function generating means for converting the vertical frame position information S to predetermined corrected vertical frame information in accordance with the control signal and outputting the converted information, vertical deflection waveform generating means for generating and outputting a vertical deflection waveform signal on the basis of the corrected vertical frame information, and horizontal deflection correcting waveform generating means for generating and outputting a horizontal deflection correcting waveform signal, wherein the corrected vertical frame information W output from the function generating means is corrected as follows:

$$W=\beta(S+\alpha)+\gamma(S+\alpha)^2+\delta(S+\alpha)^3$$

($\alpha$, $\beta$, $\gamma$ and $\delta$ are correction parameters).

Further, another object of the present invention is to provide a television set having the cathode ray tube display as described above.

A cathode ray tube display according to the present invention may be further provided with a first comparator for comparing the corrected vertical frame information w output from the function generating means with a first reference voltage and a second comparator for comparing the corrected vertical frame information w with a second reference voltage According to the present invention, when the frame size in the vertical direction and the frame (picture) position in the vertical direction are adjusted, the position information S of the vertical frame is converted to corrected vertical frame information W corresponding to the adjustment by the function generating means and then supplied to the vertical deflection waveform generator and the horizontal deflection correcting waveform generator and therefore no distortion occurs in the vertical linearity, the horizontal pin cushion, etc.

Further, the corrected vertical frame information W is compared with a predetermined reference voltage by the comparator, whereby the effective range in the vertical direction on the frame can be known Therefore, limitation on the deflection current or application of blanking to pictures can be easily performed

DETAILED DESCRIPTION OF THE PREFERRED EMBODIMENTS

Preferred embodiments of the present invention will be described hereunder.

Figure 6:
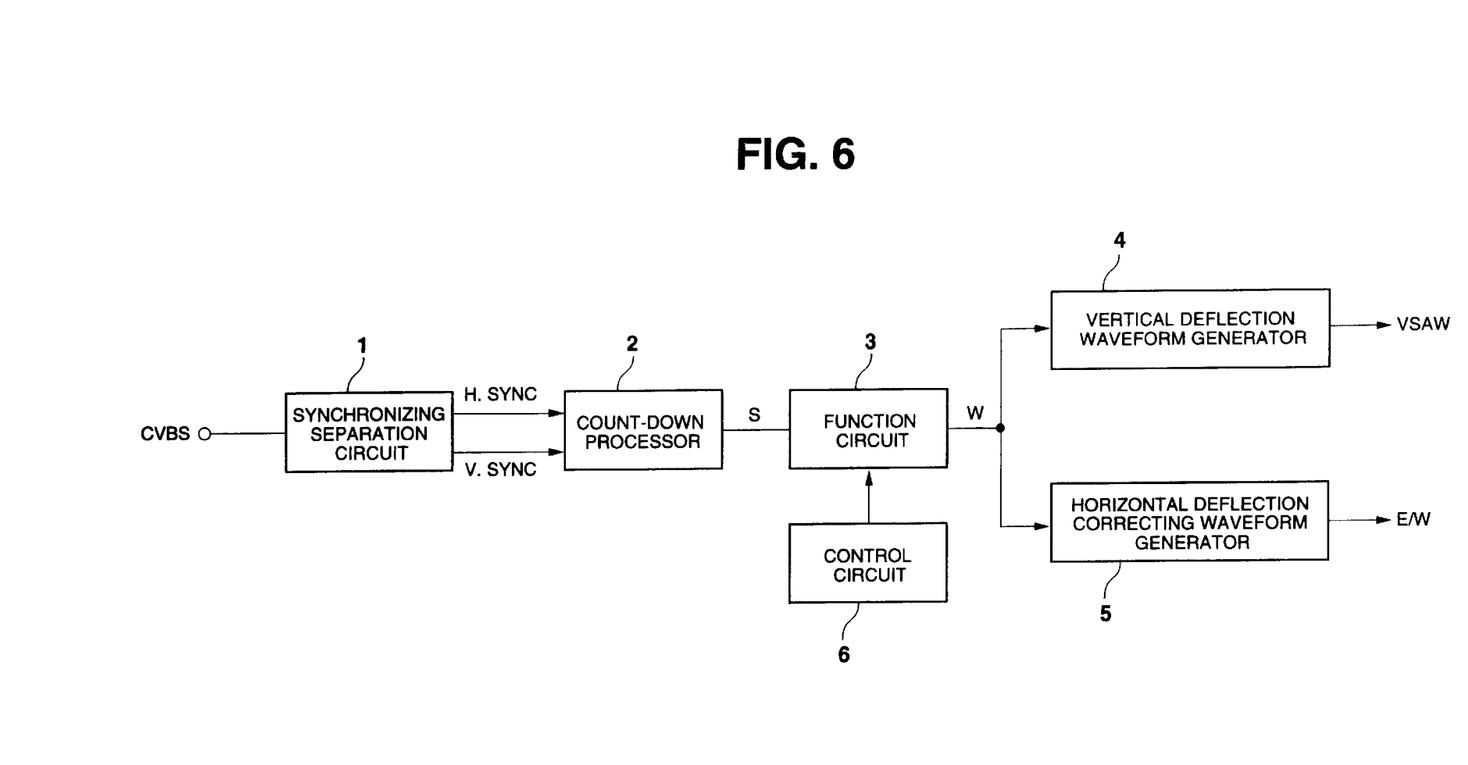
FIG. 6 is a block diagram showing a deflection system of a CRT display according to a first embodiment of the present invention.

FIG. 6 is a block diagram showing a deflection system circuit of a cathode ray tube (hereinafter referred to as "CRT") display having a screen of aspect ratio 16:9 according to a first embodiment, which is mounted in a wide television or the like.

In FIG. 6, reference numeral 1 represents a synchronizing separation circuit which separates vertical synchronizing signals (V.SYNC) and horizontal synchronizing signals (V.SYNC) from video signals (CVBS) which are supplied from a previous stage circuit of a television set (not shown). Reference numeral 2 represents a count-down processor comprising a counter or the like, and it is normally reset by the vertical synchronizing signals and counts the horizontal synchronizing signals, but for example even when the vertical synchronizing signal (V.SYNC) is missing from the synchronizing separation circuit 1, the count-down processor 2 generates and outputs position information S of the vertical frame which is reset at the period of the vertical synchronization.

Reference numeral 3 represents a function circuit which serves to convert the position information S of the vertical frame supplied from the count-down processor 2 according to a conversion equation (3) shown below when the vertical frame size and the frame (picture) position in the vertical direction are adjusted, and then output predetermined corrected vertical frame information W. Reference numeral 4 represents a vertical deflection waveform generator which serves to output a vertical deflection waveform signal (VSAW) which has been subjected to a predetermined adjustment on the basis of the corrected vertical frame information W supplied from the function circuit 3. Reference numeral 5 represents a horizontal deflection correcting waveform generator which serves to output a horizontal deflection correcting waveform signal (E/W) for adjusting the horizontal deflection waveform signal on the basis of the corrected vertical frame information w supplied from the function circuit 3. Reference numeral 6 represents a control circuit comprising a microcomputer or the like, and it serves to output a control signal for controlling each parameter of the conversion equation (3) shown below of the function circuit 3.

The operation of the CRT display of the first embodiment will be described hereunder with reference to FIGS. 7A, 7B, 8A and 8B.

First, in the normal mode in which 4:3 pictures are directly displayed on a 16:9 screen, the synchronizing separation circuit 1 separates the vertical synchronizing signals (V.SYNC) and the horizontal synchronizing signals (H.SYNC) from for example composite video signals (CVBS) fed from a previous stage in the television set and supplies the signals to the count-down processor 2. On the basis of the vertical synchronizing signals (V.SYNC) and the horizontal synchronizing signals (H.SYNC), the count-down processor 2 generates the position information S of the vertical frame which is reset at the period of the vertical synchronizing signal (V.SYNC) and outputs it to the function circuit 3.

According to the conversion equation (3) below, the function circuit 3 converts the instantaneous value s in the vertical direction of electron beams which are scanned on the basis of the vertical deflection waveform signal of the position information S in the vertical direction of the frame and outputs the corrected vertical frame information W.

$$w=\beta((s+\alpha)+\gamma(s+\alpha)^2+\delta(s+\alpha)^3) \quad (3)$$

where $\alpha$: parameter to adjust vertical frame position
$\beta$: parameter to adjust vertical frame size
$\gamma, \delta$: parameter to adjust vertical linearity Here, for the 4:3 frame in the normal mode, the control circuit 6 outputs control signals so that the values of the respective parameters are $\alpha=0$, $\beta=1$, $\gamma=\delta=0$. That is, the position information S of the vertical frame which is supplied to the function circuit 3 is directly output as the corrected vertical frame information W to the vertical deflection waveform generator 4 and the horizontal deflection correcting waveform generator 5.

In the vertical deflection waveform generator 4, the instantaneous value w of the corrected vertical frame information W is adjusted according to the following function equation (4) as with the function equation (1) and the vertical deflection waveform signal (VSAW) is output.

$$VSAW: v(w)=B(Cw^3+Dw^2+w)+A \quad (4)$$

where A: parameter to adjust vertical frame position
B: parameter to adjust vertical frame size
C, D: parameter to adjust vertical linearity In this case, the values of the respective parameters "A" to "D" of the function equation (1) are set to "a", "b", "c" and "d" with which a predetermined vertical deflection waveform signal (VSAW) is output.

On the other hand, in the horizontal deflection correcting waveform generator 5, the instantaneous value w of the corrected vertical frame information W is corrected according to the following function equation (5) as with the function equation (2) and the horizontal deflection correcting waveform signal (E/W) is output.

$$E/W: u(w)=F(Gw^4+w^2+Hw)+E \quad (5)$$

where E: parameter to adjust horizontal frame size
F: parameter to correct horizontal pin distortion
G: parameter to correct horizontal corner pin distortion
H: parameter to correct horizontal trapezoidal distortion.

In this case, the values of the respective parameters "E" to "H" of the function equation (4) are set to values "e", "f", "g" and "h" with which a predetermined horizontal deflection correcting waveform signal (E/W) is output.

That is, the values of the respective parameters of the function equation (4) of the vertical deflection waveform generator 4 and the function equation (5) of the horizontal deflection correcting waveform generator 5 are set to predetermined constant values "a" to "h" so as to obtain the vertical deflection waveform signal (VSAW) and the horizontal deflection correcting waveform signal (E/W) for adjusting the horizontal deflection waveform signal with which an image having no image distortion is output on the basis of the corrected vertical frame information w supplied in the normal mode.

Next, the adjustment of the frame size and the frame position in the vertical direction in the zoom mode and the scroll mode will be described.

First, when pictures are enlarged (reduced) in the zoom mode, the control circuit 6 supplies the function circuit 3 with a control signal corresponding to the enlargement (reduction) amount The function circuit 3 controls, for example, the value of the parameter "$\beta$" of the conversion equation (3) above in accordance with the control signal. Accordingly, the position information S of the vertical frame which is supplied from the count-down processor 2 is multiplied by $\beta$ in the conversion equation (3) and then output as the corrected vertical frame information w.

Figure 7A:
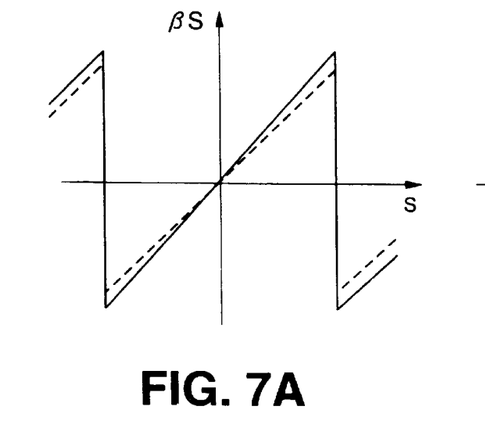
FIGS. 7A and 7B are diagrams showing corrected vertical frame information when a zoom mode is set in the CRT display of the first embodiment.

That is, in the case where corrected vertical frame information w having the waveform whose slope is indicated by a chain line in FIG. 7A in the normal mode is enlarged in the zoom mode, it is converted to corrected vertical frame information W which corresponds to the position of the vertical direction and in which the slope of the position information S of the vertical frame is multiplied by $\beta$ as indicated by a solid line in FIG. 7A, and then supplied to the vertical deflection waveform generator 4 and the horizontal deflection correcting waveform generator 5.

Figure 7B:
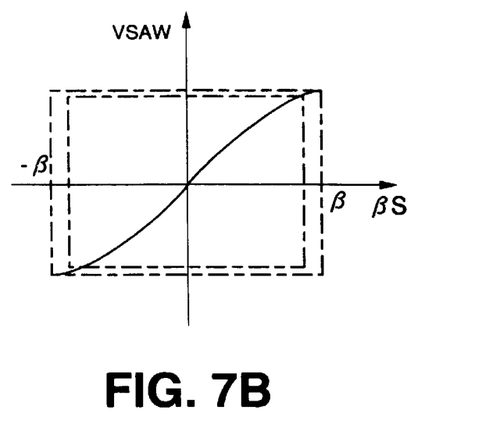

Accordingly, even when the values of the parameters "A" to "D" of the function equation (4) of the vertical deflection waveform generator 4 are left as "a" to "d", the waveform of the vertical deflection waveform signal (VSAW) to be output is varied from the waveform indicated by a chain line portion of FIG. 7B to the $\beta$-multiplied waveform indicated by a one-dotted chain line portion as shown in FIG. 7B. Therefore, the frame size of the vertical direction can be adjusted without changing the values "A" to "D" of the respective parameters of the function equation (4).

Further, when a picture is vertically scrolled in the scroll mode, the control circuit 6 supplies the function circuit 3 with a control signal corresponding to the scroll amount. The function circuit 3 controls the value of the parameter "α" of the conversion equation (3) above in accordance with the control signal. Accordingly, the position information S of the vertical frame supplied from the count-down processor 2 is output as the corrected vertical frame information W which is shifted by an amount corresponding to α.

Figure 8A:
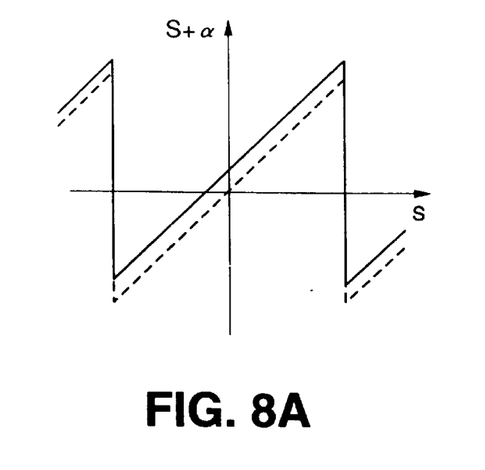
FIGS. 8A and 8B are diagrams showing corrected vertical frame information when a scroll mode is set in the CRT display of the first embodiment.

Here, for example, when the corrected vertical frame information W having the waveform indicated by a chain line in FIG. 8A in the normal mode is scrolled in the scroll mode, the corrected vertical frame information W which is obtained by shifting the position information S of the vertical frame by an amount corresponding to a as indicated by a solid line in FIG. 8A is supplied to the vertical deflection waveform generator 4 and the horizontal deflection correcting waveform generator 5.

Figure 8B:
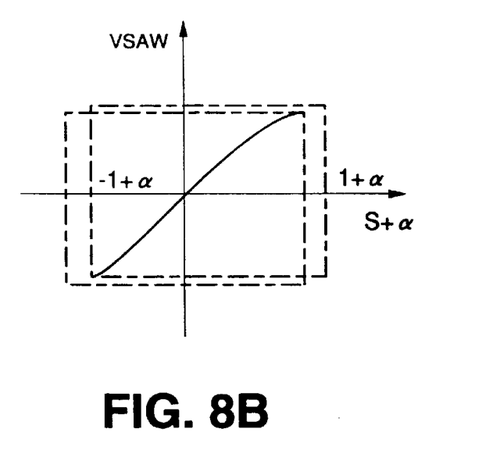

Accordingly, even when the values of the parameters "A" to "D" of the function equation (4) are left as "a" to "d" in the vertical deflection waveform generator 4, the output vertical deflection waveform signal (VSAW) has a waveform which is shifted from the waveform indicated by a chain line portion of FIG. 8B by an amount corresponding to α and varies to a range indicated by a one-dotted chain line portion shown in FIG. 8B. Therefore, the adjustment of the frame position in the vertical direction can be performed without changing the values "A" to "D" of the respective parameters of the function equation.

Further, the vertical linearity can be controlled by controlling the parameters "γ" and "δ" of the conversion equation (3) of the function circuit 3 by the control circuit 6. For example, in the wide zoom mode or the like in which a picture portion protruding in the vertical direction is displayed compressed in the vertical direction on the screen, non-linearity is established by intentionally adjusting or correcting the vertical linearity As described above, by controlling the values of the parameters "α", "β", "γ" and "δ" of the conversion equation (3) provided to the function circuit 3, the adjustment of the vertical frame size, the adjustment of the position in the vertical direction and the adjustment of the vertical linearity can be performed without changing the values "A" to "D" of the respective parameters of the function equation (4) of the vertical deflection waveform generator 4.

Further, with respect to the horizontal deflection correcting waveform signal (E/W), the signal waveform for correction is output on the basis of the corrected vertical frame information W which is corrected and output in the zoom or scroll mode as shown in the function equation (5), and therefore the pin cushion distortion which occurs due to the variation of the set values "A" to "D" of the function equation (1) for a standard screen in the prior art is eliminated and thus it is unnecessary to change the values "E" to "H" of the respective parameters of the function equation (5) for correcting the horizontal deflection correcting waveform signal (E/W).

Figure 9:
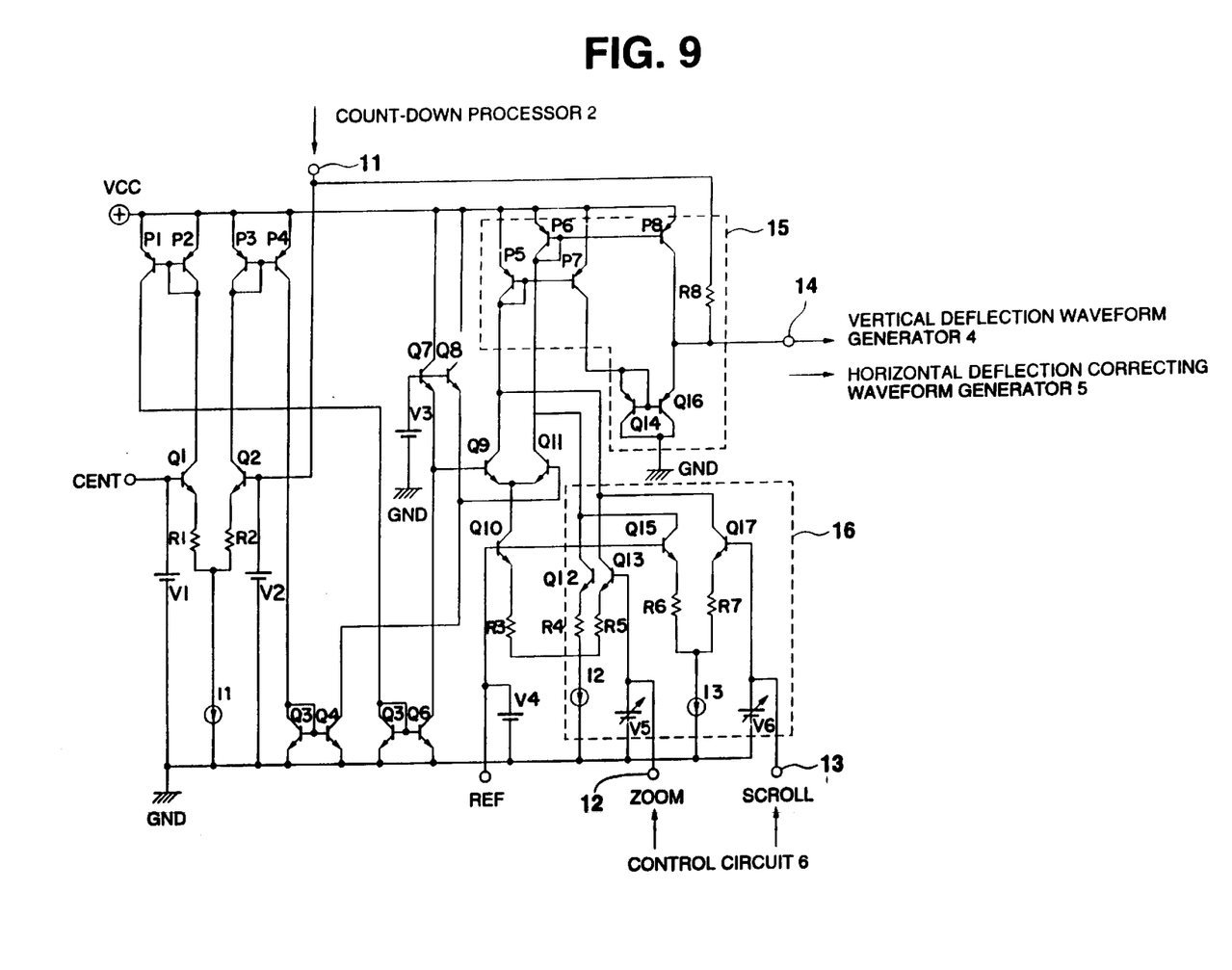
FIG. 9 is a circuit diagram of a function circuit of the CRT display of the first embodiment.

FIG. 9 is a circuit diagram showing the function circuit 3 described above, and reference numeral 11 represents an input terminal which is supplied with the position information S of the vertical frame from the count-down processor 2, reference numeral 12 represents a terminal to which a predetermined voltage is applied from the control circuit 6 as a control signal when the mode is set to the zoom mode, reference numeral 13 represents a terminal to which a predetermined voltage is applied as a control signal from the control circuit 6 when the scroll mode is set, and reference numeral 14 represents an output terminal for outputting the converted corrected vertical frame information W.

Reference numeral 15 represents an output block. It comprises PNP transistors P5 to P8, NPN transistors Q14 and Q16, and a resistor R8, and serves to convert the position information S of the vertical frame supplied from the count-down processor 2 to the corrected vertical frame information W and output it to the output terminal 14.

Reference numeral 16 represents an adjustment block comprising NPN transistors Q12, Q13, Q15 and Q17, resistors R4 to R7 and voltage sources V5 and V6. The control signal which is supplied from the terminals 12 and 13 is applied to the base electrodes of the transistors Q12, Q13 and Q17.

With this construction, the amplitude and/or the DC component of the position information S of the vertical frame which is supplied from the count-down processor 2 is adjusted, and the corrected vertical frame information W can be output from the output terminal 14 while the amplitude thereof is enlarged (reduced) and/or the waveform thereof is shifted in the vertical direction That is, in this case, the control voltage to be applied to the terminal 12 is the parameter "β" of the conversion equation (3) above and the control voltage to be applied to the terminal 13 is the parameter "α". Therefore, the position information S of the vertical frame is converted to the corrected vertical frame information W on the basis of the conversion equation (3).

In this embodiment, the function circuit 3 comprises an analog circuit However, it is needless to say that it may be constructed as a digital circuit by a ROM table which is read out on the basis of the position information S.

Figure 10:
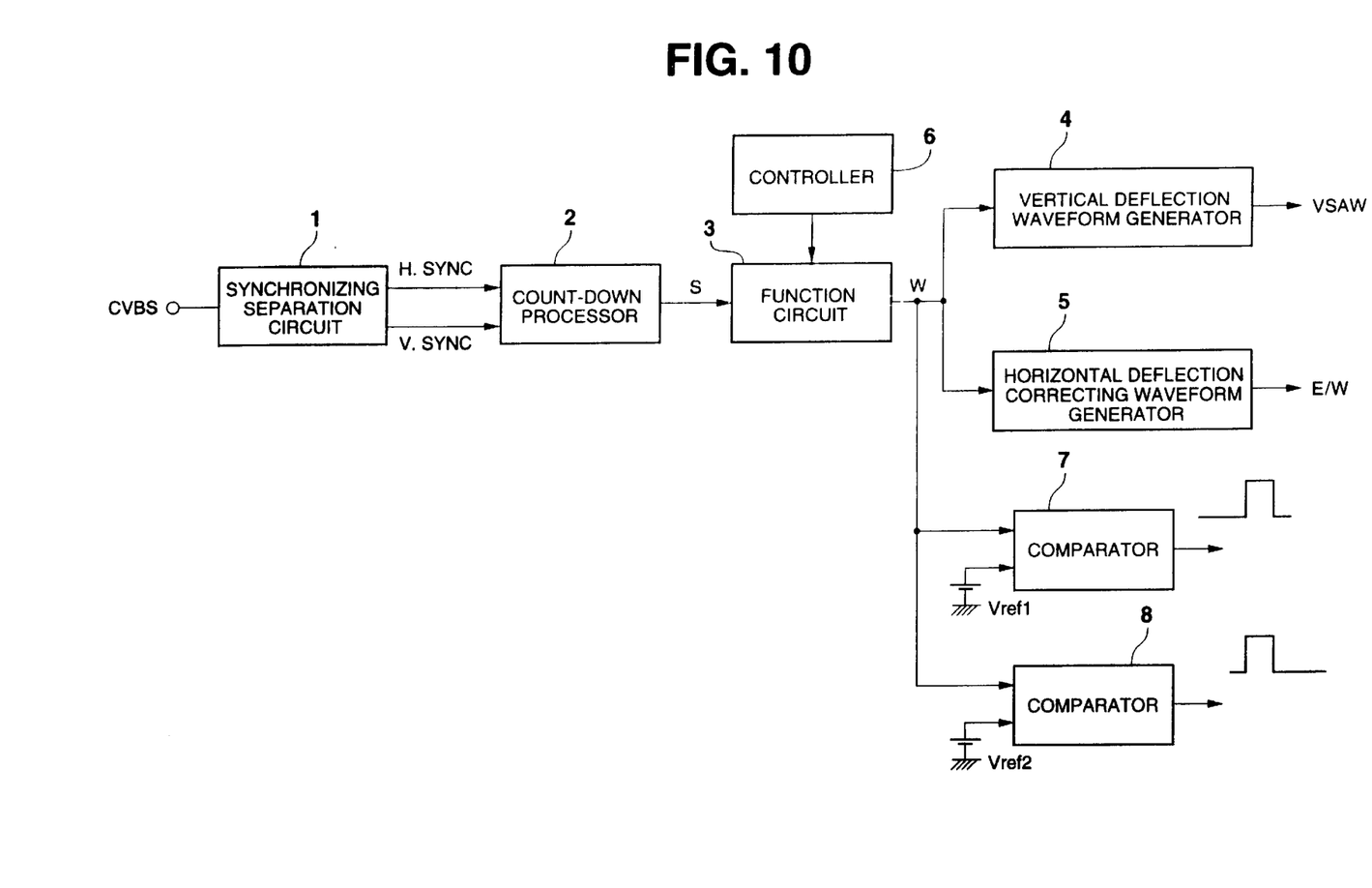
FIG. 10 is a block diagram of a deflection system of the CRT display according to a second embodiment of the present invention.
Figure 11A:
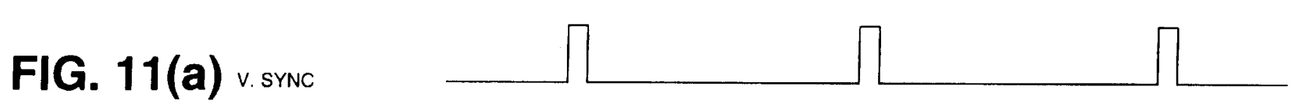
FIG. 11 shows time charts of the waveform of each part of the CRT display of the second embodiment.
Figure 11B:
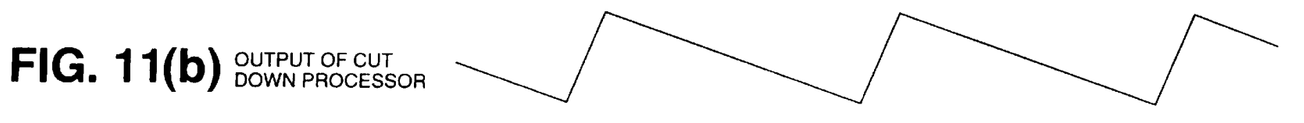
Figure 11C:
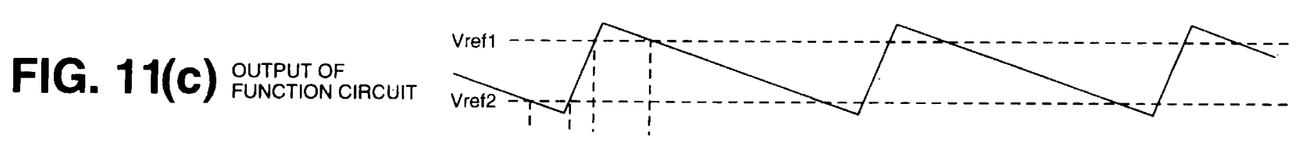
Figure 11D:
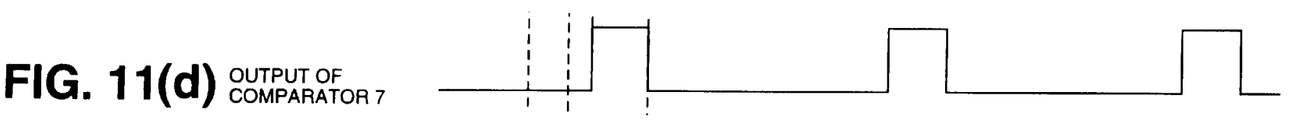
Figure 11E:
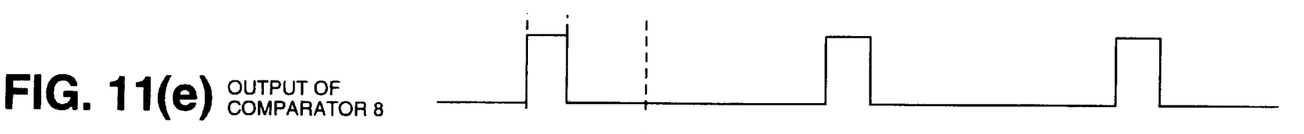
Figure 11F:
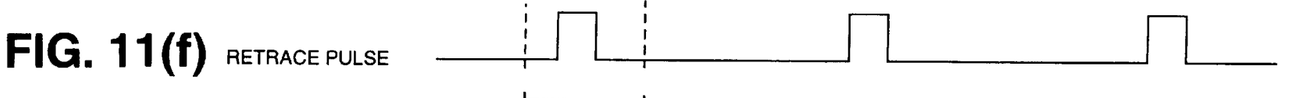
Figure 11G:
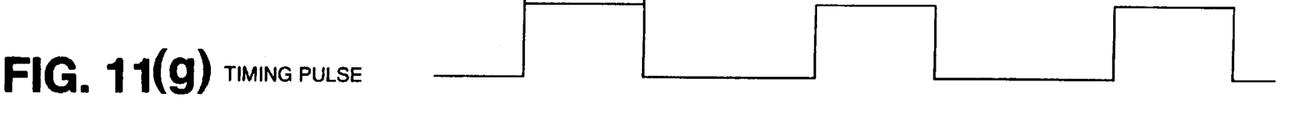

Next, FIG. 10 is a block diagram showing a CRT display mounted in a wide television or the like according to a second embodiment of the present invention.

The same blocks as the first embodiment of FIG. 2 are represented by the same reference numerals, and the description thereof is omitted.

In FIG. 10, a comparator 7 compares the corrected vertical frame information w output from the function circuit 3 with a predetermined reference voltage Vref1 and outputs a detection signal when the corrected vertical frame information W is above the reference voltage Vref1.

Further, a comparator 8 compares the corrected vertical frame information W output from the function circuit 3 with a predetermined reference voltage Vref2 and outputs a detection signal when the corrected vertical frame information W is below the reference voltage Vref2.

The operation of the CRT display shown in FIG. 10 will be described with reference to the waveform diagram of each part of FIG. 11.

The vertical synchronizing signal (V.SYNC) shown in a part (a) of FIG. 11 is output from the synchronizing separation circuit 1, and the position information S of the vertical frame corresponding to the vertical synchronizing signal as shown in a part (b) of FIG. 11 is output from the count-down processor. The position information S of the vertical frame is subjected to the predetermined calculation as described above in the function circuit 3. For example, it is converted to the corrected vertical frame information W as shown in a part (c) of FIG. 11 and then supplied to the vertical deflection waveform generator 4, the horizontal deflection correcting waveform generator 5 and the comparators 7 and 8.

The corrected vertical frame information w supplied to the comparator 7 is compared with the predetermined reference voltage Vref1, and when the corrected vertical frame information W is above the reference voltage Vref1 a detection signal as shown in a part (d) of FIG. 11 is output On the other hand, the corrected vertical frame information w supplied to the comparator 8 is compared with the predetermined reference voltage Vref2 and when the corrected vertical frame information W is below the reference voltage Vref2 a detection signal as shown in a part (e) of FIG. 11 is output.

That is, the reference voltage Vref1 of the comparator 7 is set to correspond to the upper end of the effective frame of the CRT display while the reference voltage Vref2 of the comparator 8 is set to correspond to the lower end of the effective frame, whereby a timing pulse as shown in a part (g) of FIG. 11 can be formed together with a retrace pulse as shown in a part of FIG. 11.

Accordingly, if this timing pulse is a video blanking signal, the blanking can be accurately performed on the video signals, the deflection current can be easily limited irrespective of the screen mode, the output timing of video signals, for example of characters, can be calculated by calculating the frame position in the vertical direction, and the sections of the effective frame can be ascertained irrespective of the various display modes and functions.

Figure 12:
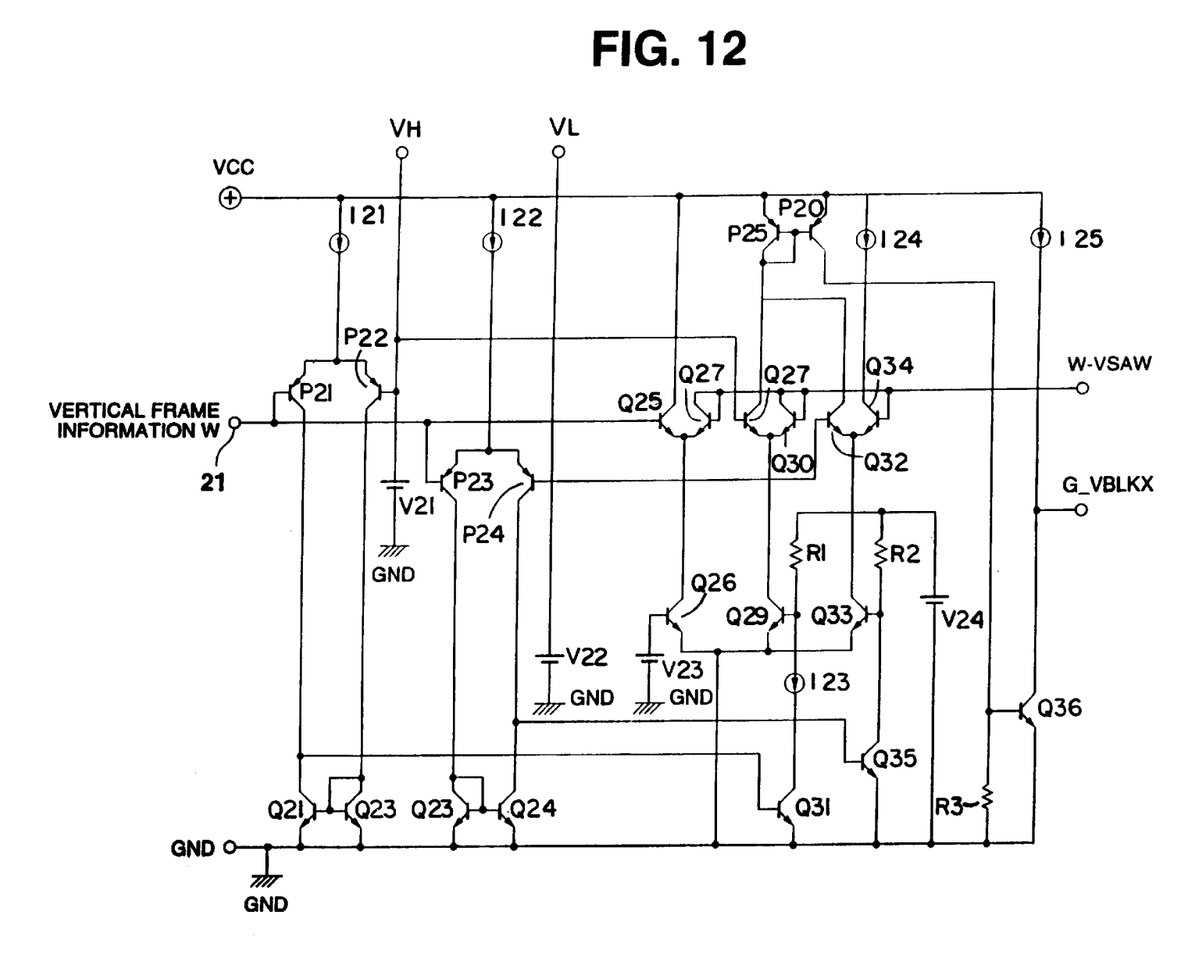
FIG. 12 is a circuit diagram of a comparator of the CRT display of the second embodiment.

FIG. 12 is a circuit diagram showing the comparator of the CRT display shown in FIG. 10.

In FIG. 12, a terminal 21 represents an input terminal to which the corrected vertical frame information W is supplied from the function circuit 3. P21 to P24 represent PNP transistors, Q21 to Q36 represent NPN transistors, R21 to R24 represent resistors, and V21 to V25 represent voltage sources. The voltage source V21 is set as the reference voltage Vref1 of the comparator 7 and the voltage source V22 is set as the reference voltage Vref2 of the comparator 8. The voltage source V24 is set to a voltage higher than the voltage source V23.

Here, when the corrected vertical frame information w which is input from the terminal 21 is higher than the reference voltage Vref1, the transistor P21 is switched off, and the transistors P22 and P24 are switched on, and as a result the transistor Q31 is switched off and the transistor Q35 is switched on. Further, since the voltage source V24 is set to a voltage higher than the voltage source V23, upon switch-off of the transistor Q31, the transistor Q29 is switched on and the transistor Q26 and the transistor Q33 are switched off.

When the transistor Q29 is switched on, the transistor Q28 and the transistor Q30 are switched on and therefore the same voltage as the base voltage of the transistor Q28, that is, the voltage V21 is output as the vertical deflection waveform signal (VSAW).

For example, when Vref1>corrected vertical frame information W>Vref2, the transistor P21 is switched on and the transistor P22 is switched off and as a result the transistor Q31 is switched on. Further, the transistor Q24 is also switched on, and thus the transistor Q35 and the transistor Q31 are switched on. As a result, the transistor Q26 is switched on and the transistors Q29 and Q33 are switched off. Therefore, the same voltage as the base voltage of the transistor Q25, that is, the corrected vertical frame information W is output as the corrected deflection waveform signal VSAW.

Further, for example, when Vref2 >corrected vertical frame information W, the transistors Q26 and Q29 are switched off and the transistor Q33 is switched on, so that the same voltage as the base voltage of the transistor Q32, that is, the voltage V22 is output as the vertical deflection waveform signal (VSAW).

As described above, according to the CRT display of the present invention, the position information S of the vertical frame is converted to the corrected vertical frame information W by the function circuit and then supplied to the vertical deflection waveform generator and the horizontal deflection correcting waveform generator. Therefore, when the frame size in the vertical direction or the position of the frame is adjusted, the vertical linearity and the horizontal pin cushion can be prevented from being distorted without the readjustment work which has been hitherto performed in the prior art.

Accordingly, if the horizontal deflection correcting waveform generator and the vertical deflection waveform generator are adjusted on the standard screen at the shipping time from the factory so that a predetermined waveform is output, the vertical frame size and the position of the vertical frame can be adjusted without affecting the vertical linearity and the distortion of the pin cushion in the horizontal direction.

Further, the effective range on the screen can be easily known by providing the comparator, and thus there is the advantage that if the blanking is applied to pictures on the basis of this information the deflection current can be easily limited and the frame position in the vertical direction can be calculated.

What is claimed is:

1. A cathode ray tube display including:

synchronization separating means for separating horizontal/vertical synchronizing signals from video signals;

waveform generating means for counting the horizontal/vertical synchronizing signals obtained by said synchronization separating means and outputting vertical frame position information S corresponding to the period of the vertical synchronizing signals;

control means for outputting a predetermined control signal;

function generating means for converting the vertical frame position information S to predetermined corrected vertical frame information W in accordance with the control signal and outputting the converted information W;

vertical deflection waveform generating means for receiving the corrected vertical frame information W for generating and outputting a vertical deflection waveform signal V in response to the received corrected vertical frame information W; and horizontal deflection correcting waveform generating means for receiving the corrected vertical frame information W for generating and outputting a horizontal deflection correcting waveform signal U in response to the received corrected vertical frame information W.

wherein the corrected vertical frame information W output from said function generating means is defined as follows:

$$W=\beta((S+\alpha)+\gamma(S+\alpha)^2+\delta(S+\alpha)^3)$$

wherein $\alpha$, $\beta$, $\gamma$ and $\delta$ represent selectable correction parameters.

2. The cathode ray tube display as claimed in claim 1, wherein said function generating means comprises an analog circuit.

3. The cathode ray tube display as claimed in claim 1, wherein an instantaneous value v(w) of the vertical deflection waveform signal V output from said vertical deflection waveform generating means is adjusted in response to the corrected vertical frame information W as follows:

$$v(w)=B(CW^3+DW^2+W)+A$$

wherein A, B, C and D are adjustment parameters.

4. The cathode ray tube display as claimed in claim 1, wherein an instantaneous value u(w) of the horizontal deflection correcting waveform signal U output from said horizontal deflection waveform generating means is adjusted in response to the corrected vertical frame information W as follows:

$$u(w)=F(GW^4+W^2+HW)+E$$

wherein E, F, G and H represent adjustment parameters.

5. The cathode ray tube display as claimed in claim 1, further comprising
   a first comparator for comparing the corrected vertical frame information W output from said function generating means with a first reference voltage; and
   a second comparator for comparing the corrected vertical frame information W with a second reference voltage.

6. A television set including:
   synchronization separating means for separating horizontal/vertical synchronizing signals from video signals;
   waveform generating means for counting the horizontal/ vertical synchronizing signals obtained by said synchronization separating means and outputting vertical frame position information S corresponding to the period of the vertical synchronizing signals;
   control means for outputting a predetermined control signal;
   function generating means for converting the vertical frame position information S to predetermined corrected vertical frame information W in accordance with the control signal and outputting the converted information W;
   vertical deflection waveform generating means for receiving the corrected vertical frame information W for generating and outputting a vertical deflection waveform signal in response to the received corrected vertical frame information W;
   horizontal deflection correcting waveform generating means for receiving the corrected vertical frame information W for generating and outputting a horizontal deflection correcting waveform signal in response to the received corrected vertical frame information W;
   a first comparator for comparing the corrected vertical frame information W output from said function generating means with a first reference voltage; and
   a second comparator for comparing the corrected vertical frame information W with a second reference voltage, wherein the corrected vertical frame information W output from said function generating means is [corrected] defined as follows:

$$W=\beta((S+\alpha)+\gamma(S+\alpha)^2+\delta(S+\alpha)^3)$$

wherein $\alpha, \beta, \gamma$ and $\delta$ represent selectable correction parameters.

7. A cathode ray tube display including:
   synchronization separating means for separating horizontal/vertical synchronizing signals from video signals;
   waveform generating means for counting the horizontal/ vertical synchronizing signals obtained by said synchronization separating means and outputting vertical frame position information S corresponding to the period of the vertical synchronizing signals;
   control means for outputting a predetermined control signal;
   function generating means for converting the vertical frame position information S to predetermined corrected vertical frame information W in accordance with the control signal and outputting the converted information W;
   vertical deflection waveform generating means for receiving the corrected vertical frame information W for generating and outputting a vertical deflection waveform signal V in response to the received corrected vertical frame information W; and
   horizontal deflection correcting waveform generating means for receiving the corrected vertical frame information W generating and outputting a horizontal deflection correcting waveform signal U in response to the received corrected vertical frame information W, wherein the corrected vertical frame information W output from said function generating means is defined as follows:

$$W=\beta((S+\alpha)+\gamma(S+\alpha)^2+\delta(S+\alpha)^3)$$

wherein $\alpha, \beta, \gamma$ and $\delta$ represent selectable correction parameters to correct vertical frame position, vertical frame size, and vertical linearity.

8. The cathode ray tube display as claimed in claim 7, wherein said function generating means comprises an analog circuit.

9. The cathode ray tube display as claimed in claim 7, wherein an instantaneous value v(w) of the vertical deflection waveform signal V output from said vertical deflection waveform generating means is adjusted in response to the corrected vertical frame information W as follows:

$$v(w)=B(CW^3+DW^2+W)+A$$

wherein A, B, C and D are adjustment parameters to adjust vertical frame position, vertical frame size, and vertical linearity.

10. The cathode ray tube display as claimed in claim 7, wherein an instantaneous value u(w) of the horizontal deflection correcting waveform signal U output from said horizontal deflection waveform generating means is adjusted in response to the corrected vertical frame information W as follows:

$$u(w)=F(GW^4+W^2+HW)+E$$

wherein E, F, G and H represent adjustment parameters to adjust horizontal frame size, horizontal pin distortion, horizontal corner pin distortion, and horizontal trapezoidal distortion.

11. The cathode ray tube display as claimed in claim 7, further comprising:
   a first comparator for comparing the corrected vertical frame information W output from said function generating means with a first reference voltage; and
   a second comparator for comparing the corrected vertical frame information W with a second reference voltage.

12. A television set including:
   synchronization separating means for separating horizontal/vertical synchronizing signals from video signals;
   waveform generating means for counting the horizontal/ vertical synchronizing signals obtained by said synchronization separating means and outputting vertical frame position information S corresponding to the period of the vertical synchronizing signals;

control means for outputting a predetermined control signal;

function generating means for converting the vertical frame position information S to predetermined corrected vertical frame information W in accordance with the control signal and outputting the converted information W;

vertical deflection waveform generating means for receiving the corrected vertical frame information W for generating and outputting a vertical deflection waveform signal in response to the received corrected vertical frame information W;

horizontal deflection correcting waveform generating means for receiving the corrected vertical frame information W for generating and outputting a horizontal deflection correcting waveform signal in response to the received corrected vertical frame information W;

a first comparator for comparing the corrected vertical frame information W output from said function generating means with a first reference voltage; and a second comparator for comparing the corrected vertical frame information W with a second reference voltage, wherein the corrected vertical frame information W output from said function generating means is [corrected] defined as follows:

$$W=\beta((S+\alpha)+\gamma(S+\alpha)^2+\delta(S+\alpha)^3)$$

wherein $\alpha$, $\beta$, $\gamma$ and $\delta$ represent selectable correction parameters to correct vertical frame position, vertical frame size, and vertical linearity.

\* \* \* \* \*